US008072731B2

(12) United States Patent
Shimada et al.

(10) Patent No.: US 8,072,731 B2
(45) Date of Patent: Dec. 6, 2011

(54) STATIC ELIMINATOR AND DISCHARGE ELECTRODE UNIT BUILT THEREIN

(75) Inventors: Tomonori Shimada, Osaka (JP); Kazunori Kobayashi, Osaka (JP)

(73) Assignee: Keyence Corporation, Osaka (JP)

( * ) Notice: Subject to any disclaimer, the term of this patent is extended or adjusted under 35 U.S.C. 154(b) by 276 days.

(21) Appl. No.: 12/323,556

(22) Filed: Nov. 26, 2008

(65) Prior Publication Data

US 2009/0168289 A1 Jul. 2, 2009

(30) Foreign Application Priority Data

Dec. 28, 2007 (JP) ................................ 2007-341092

(51) Int. Cl.
*H02H 1/00* (2006.01)

(52) U.S. Cl. ........................ 361/213; 361/212; 361/230

(58) Field of Classification Search .................. 361/213, 361/230, 212, 222, 220, 229
See application file for complete search history.

(56) References Cited

U.S. PATENT DOCUMENTS 4,048,667 A * 9/1977 Brennecke .................... 361/213
5,550,703 A * 8/1996 Beyer et al. .................... 361/229
5,847,917 A * 12/1998 Suzuki .......................... 361/213
6,807,044 B1 * 10/2004 Vernitsky et al. ............. 361/230
7,375,944 B2 * 5/2008 Izaki et al. ..................... 361/230
2002/0093779 A1 * 7/2002 Fujii ............................. 361/231

FOREIGN PATENT DOCUMENTS

JP 2002-260821 A 9/2002

* cited by examiner

*Primary Examiner* — Patrick Salce
(74) *Attorney, Agent, or Firm* — Smith Patent Office

(57) ABSTRACT

There is provided a static eliminator capable of improving a sheath effect exerted by shielding a leading end of a discharge electrode by a clean gas so as to prevent the leading end of the discharge electrode from being contaminated, in which a first-stage circumferential chamber, a second-stage circumferential chamber and a first gas pool are arrayed in series along the longitudinal direction of a discharge electrode, the first gas pool is disposed in the mode of diametrically overlapping a gas outflow channel for shielding located on the inner circumferential side of the first gas pool, and a clean gas is supplied to the first gas pool through the chambers disposed at multi-stages by means of the circumferentially spaced multi-stage orifices (the first and second chases).

13 Claims, 17 Drawing Sheets

STATIC ELIMINATOR AND DISCHARGE ELECTRODE UNIT BUILT THEREIN

CROSS-REFERENCE TO RELATED APPLICATIONS

The present application claims foreign priority based on Japanese Patent Application No. 2007-341092, filed Dec. 28, 2007, the contents of which is incorporated herein by reference.

BACKGROUND OF THE INVENTION

1. Field of the Invention

The present invention relates to a static eliminator used for eliminating static electricity of a workpiece, and a discharge electrode unit built therein.

2. Description of the Related Art

For the purpose of eliminating static electricity of a workpiece, a corona discharge type static eliminator has often been used. Typically, in a static eliminator having a long bar shape, a plurality of discharge electrodes are mounted in a longitudinally spaced condition, and a high voltage is applied to these discharge electrodes to generate an electric field between the discharge electrodes and the workpiece and thereby to apply ions to the workpiece so that static electricity of the workpiece is eliminated.

A static eliminator disclosed in Japanese Unexamined Patent Publication No. 2002-260821 will be described below. A gas main channel is provided along the longitudinal direction of a static eliminator, and a purified gas (clean gas) flowing in this gas main channel is distributed to the periphery of each discharge electrode. A gas pool extending along the longitudinal direction of the discharge electrode is mounted around each discharge electrode. The clean gas is supplied from the gas main channel to this gas pool through an orifice provided between the gas pool and the gas main channel. The clean gas flowing into the gas pool is allowed to flow to the outside through a plurality of assist air outflow holes formed around the leading end of the discharge electrode, and a gas flow along the shaft line of the discharge electrode is generated.

SUMMARY OF THE INVENTION

The clean gas outflow from the vicinity of the discharge electrode serves to shield the leading end of the discharge electrode with the gas so as to realize a sheath effect of preventing the leading end of the discharge electrode from being contaminated.

An object of the present invention is to provide a static eliminator and a discharge electrode unit built therein which are capable of improving the sheath effect.

According to a first aspect of the present invention, the above-mentioned technical object is achieved by providing a static eliminator, having: discharge electrodes, disposed while mutually longitudinally spaced in a long case; an internal gas channel, provided inside the case and extends from one end of the case through the other end thereof; a gas outflow channel for shielding which extends concentrically with the discharge electrode while in contact with the outer circumferential surface of the discharge electrode; a gas pool, provided on the outer circumference of the gas outflow channel for shielding and is mounted concentrically with the gas outflow channel for shielding; and an orifice, mounted between the gas pool and the internal gas channel.

Further, according to a second aspect of the present invention, the above-mentioned technical object is achieved by providing a discharge electrode unit detachably built in a static eliminator, which supplies a clean gas from an internal gas channel to the periphery of a discharge electrode, and applies a high voltage to the discharge electrode to generate ions and also shield the leading end of the discharge electrode with the gas, and the discharge electrode unit has: inside and outside cylindrical walls which are concentric with the discharge electrode; a discharge electrode holding member for detachably fixing a basic end section of the discharge electrode to the outside cylindrical wall; a gas outflow channel for shielding which is mounted in a open-top/end central long hole of the inside cylindrical wall and extends along the discharge electrode while in contact with the circumferential surface of the discharge electrode; a gas pool, formed between the inner cylindrical wall and the outside cylindrical wall; a chamber, formed between a circumferential groove formed on the outer circumferential surface of the discharge electrode holding member and the inner circumferential surface of the outside cylindrical wall; a first orifice which communicates the chamber with the internal gas channel; and a second orifice, which communicates the chamber with the gas pool, and is disposed while circumferentially offset from the first orifice.

The above objects, the other objects, and the working effect of the present invention will become apparent from the following detailed description of preferred embodiments of the present invention.

DETAILED DESCRIPTION OF THE PREFERRED EMBODIMENTS

Figure 1:
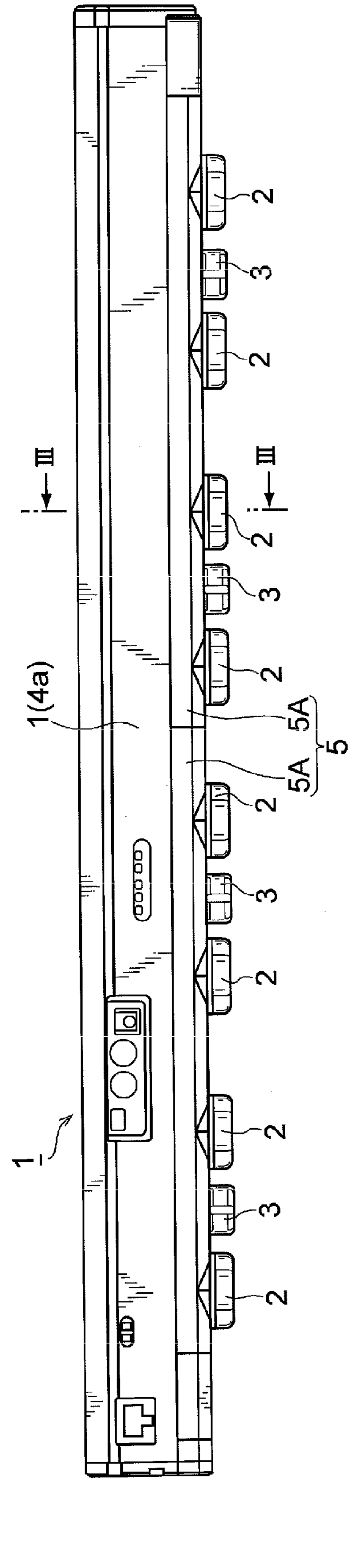
FIG. 1 is a side view of a static eliminator of an embodiment.

An embodiment of the present invention will be described in detail below with reference to the accompanying drawings. FIG. 1 is a side view of a static eliminator of an embodiment. In a static eliminator 1, eight main discharge electrode units 2 and four additional discharge electrode units 3 are mounted in a plurality of number in a longitudinally spaced condition on the bottom surface of a case 1*a* with a long external outline. It is to be noted that the four additional discharge electrode units 3 are attached and detached according to the user's option, and the configuration of this additional discharge electrode unit 3 is approximately equal to a basic configuration of the main discharge electrode unit 2. The difference between the main discharge electrode unit 2 and the additional discharge electrode unit 3 will be described below.

Figure 2:
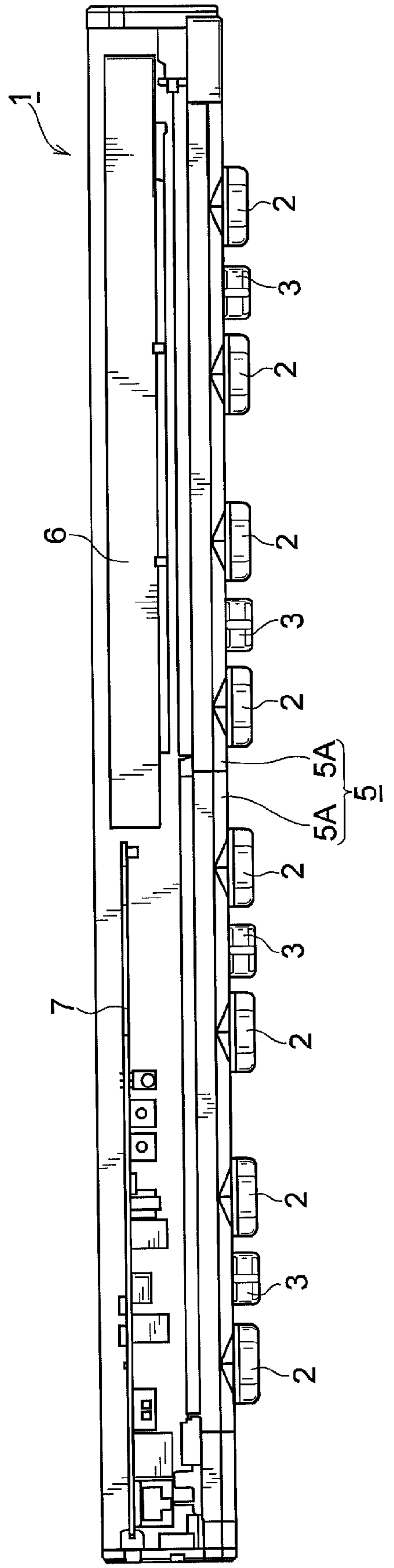
FIG. 2 is a side view showing the static eliminator of the embodiment with an outer case removed therefrom.
Figure 3:
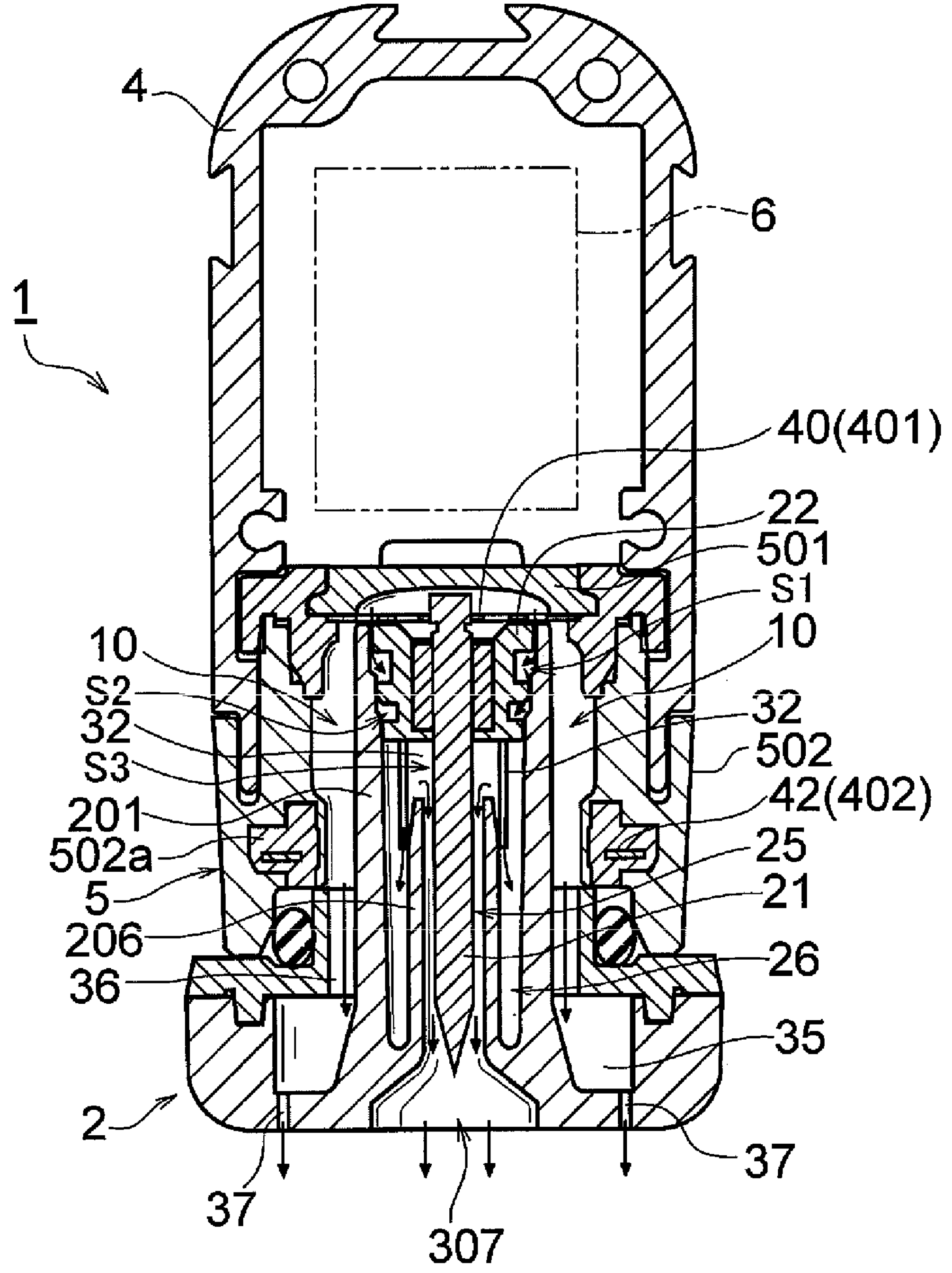
FIG. 3 is a cross sectional view along line III-III of FIG. 1.

The outer case 4 for covering the upper half of the static eliminator 1 has a closed-top open-end cross-sectionally inverted U shape with its top closed and its bottom open (FIG. 3), and is detachable from a base 5 constituting the lower portion of the external boarder of the lower external outline of the static eliminator 1. FIG. 2 shows the static eliminator 1 in a state where the outer case 4 has been removed. FIG. 3 is a sectional view along line III-III of FIG. 1. With reference to FIG. 2, in the static eliminator 1, a high voltage unit 6 and a control substrate 7 including, for example, a display circuit and a CPU are mounted in the upper region surrounded by the outer case 4.

Figure 16:
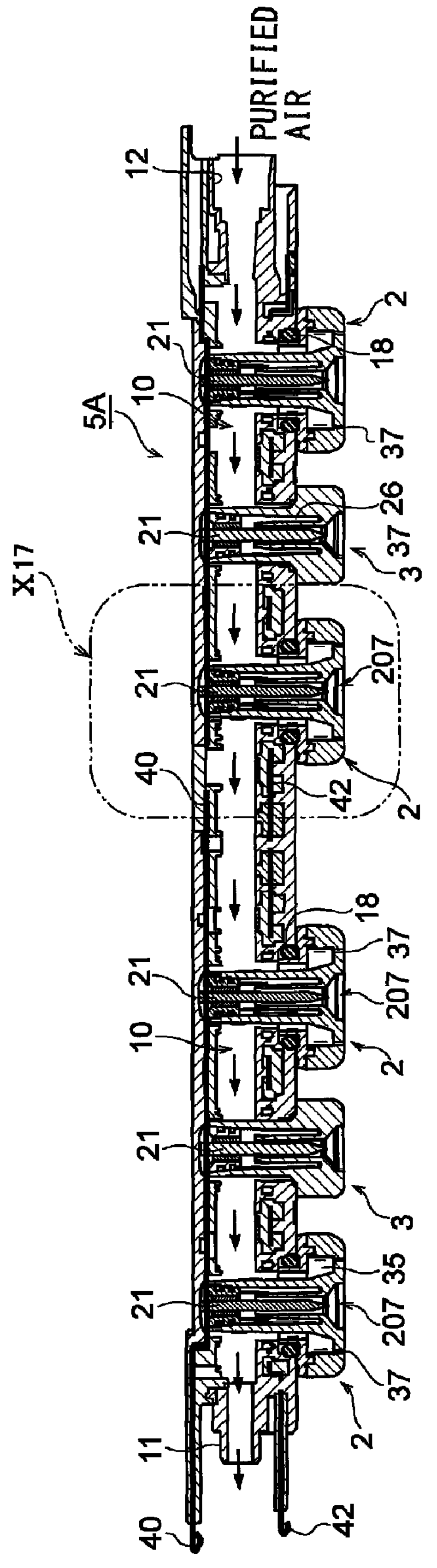
FIG. 16 is a sectional view of the half base.

The base 5 constituting the lower portion of the static eliminator 1 is formed by mutual connection of two half bases 5A, 5A with substantially the same configuration along the longitudinal direction of the static eliminator 1. On each half base 5A, four main discharge electrode units 2 and two additional discharge electrode units 3 are mountable, and as understood from FIG. 3, a plurality of insulating synthetic resin members are combined, to form an internal gas channel 10 having a closed cross-section with its top, bottom, right and left sides closed. This internal gas channel 10 continuously extends in the longitudinal direction of each half base 5A as shown in FIG. 16.

Figure 4:
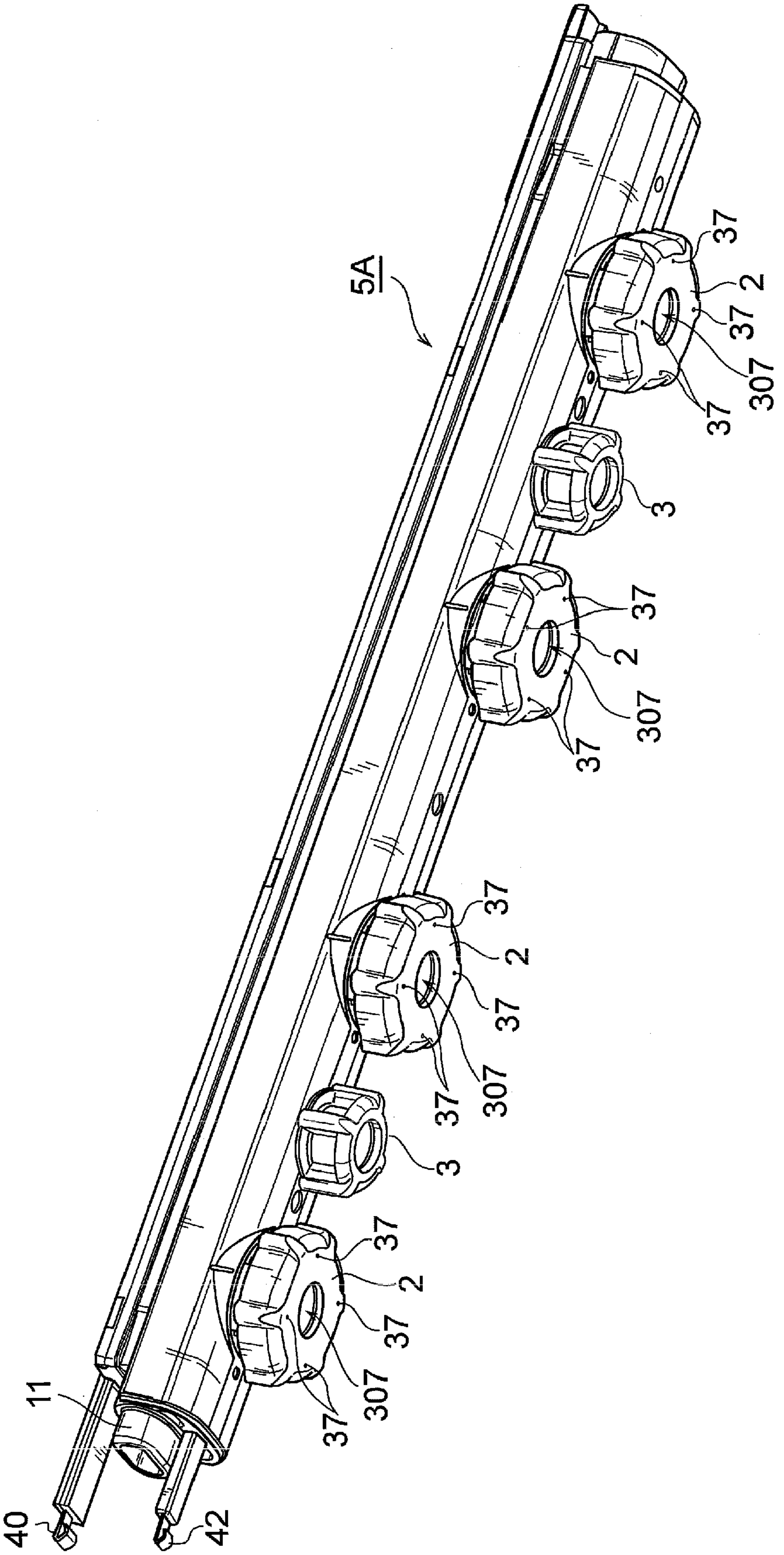
FIG. 4 is a perspective view of a half base constituting the half of a base of the static eliminator.

FIG. 4 is a perspective view of the half base 5A. The half base 5A is shown in the figure in a state where the main discharge electrode units 2 and the additional discharge electrode units 3 have been built therein. The one end (the left end of the top in the figure) of the half base 5A has a projected gas channel connecting port 11, and a depressed gas connecting port 12 (see later-described FIG. 16) to accept this gas channel connecting port 11 is formed at the other end (the right end in FIG. 4) of the half base 5A. The mutually adjacent two half bases 5A, 6A form the continuous internal gas channel 10 of the static eliminator 1 by engaging of the projected gas channel connecting port 11 of the one half base 5A with the depressed gas connecting port of the other half base 5A.

Figure 5:
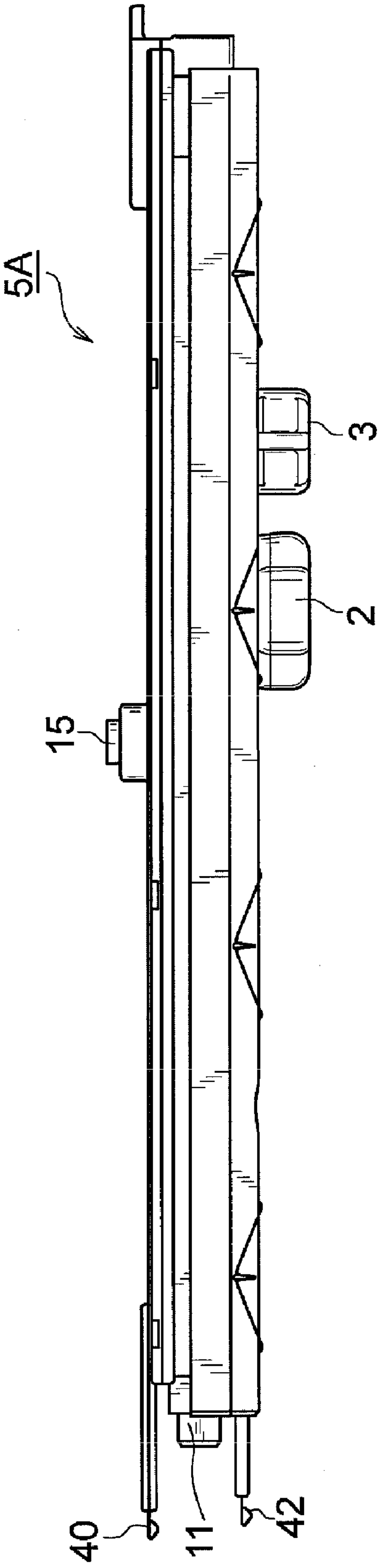
FIG. 5 is a side view of the half base.
Figure 6:
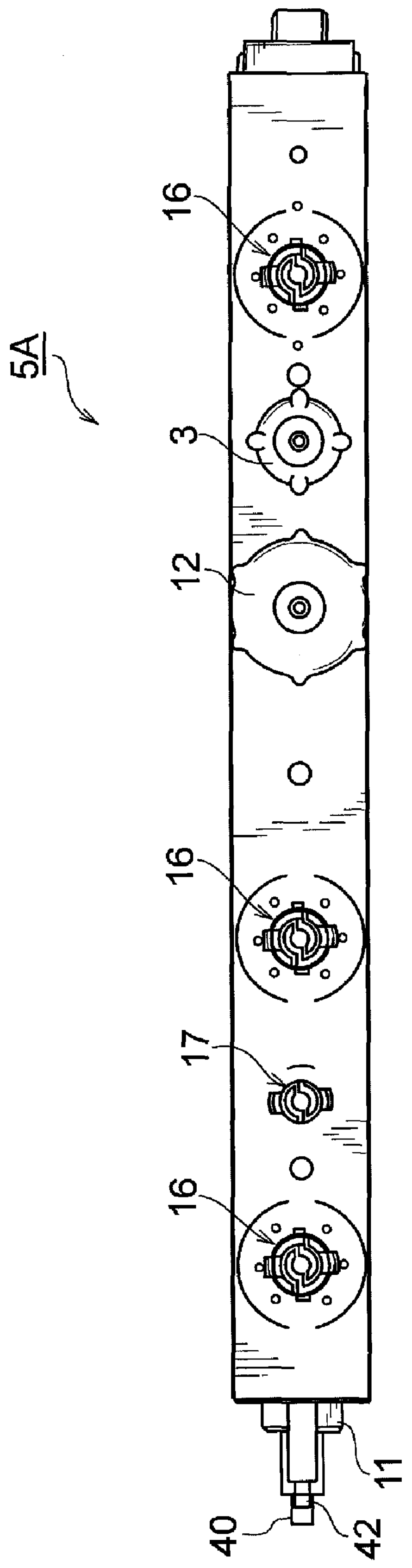
FIG. 6 is a bottom view of the half base.
Figure 7:
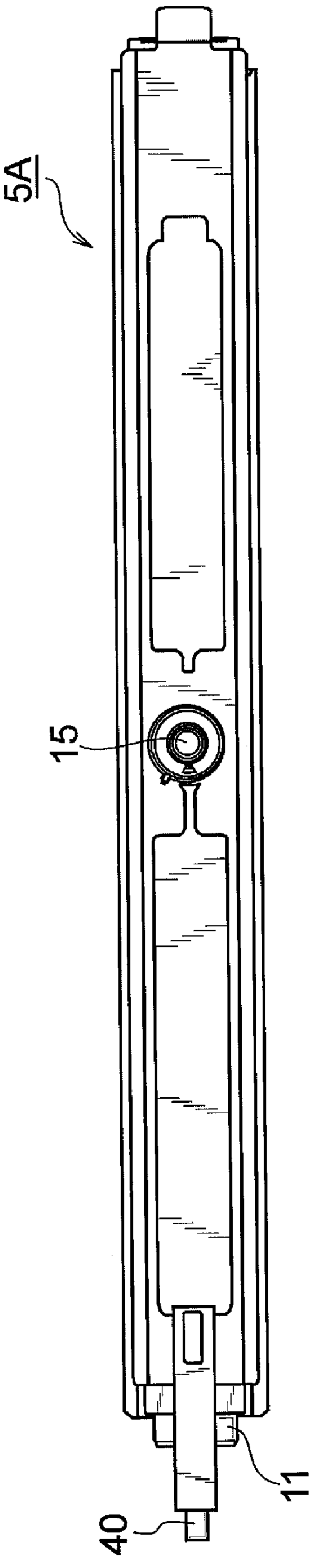
FIG. 7 is a plan view of the half base.

FIG. 5 is a side view of the half base 5A. FIG. 6 is a bottom view of the half base 5A. FIG. 7 is a plan view of the half base 5A. It is to be noted that these half base 5A are shown in FIGS. 5 to 7 in a state where one main discharge electrode unit 2 and one additional discharge electrode unit 3 have been mounted thereon.

As seen from FIGS. 5 to 7, a connector 15 is provided upward in a protruding condition in the longitudinal central portion of the top surface of the half base 5A, and through this connector 15, a high voltage generated in the high voltage unit 6 is supplied to the half base 5A. More specifically, the outer circumferential section of this connector 15 is formed of an insulating resin, and the inner section thereof is provided with a cylindrical female connector, not shown, which is open toward the top of the connector 15. The other end of this female connecter is connected to a distribution plate 40 disclosed under the connector 15. The open-end of this female connector is connected with a male connector (not shown) extending from the high voltage unit 6 provided inside the outer case 4, and a high voltage is supplied to the distribution plate 40. In addition, since only one high voltage unit 6 is provided in one static eliminator 1 even when the length of the static eliminator 1 changes, one connector 15 is practically used in one static eliminator 1.

On the bottom surface of the half base 5A formed are main unit accepting ports 16 each for accepting the main discharge electrode unit 2 and additional unit accepting ports 17 each for accepting the additional discharge electrode unit 3. Specifically, one additional discharge electrode unit 3 is provided at least in an approximately central position between a pair of main discharge electrode units 2, 2 provided in the respective half bases 5A and on the straight line connecting the main discharge electrode unit 2, 2. It should be noted that the static eliminator 1 having the additional discharge electrode unit 3 between the pair of main discharge electrode units 2,2 is effective, considering the static elimination time and the like, for a target for static elimination and a static elimination line with which static elimination is performed at a lower speed than a desired value by using only an amount of ion generated from the main discharge electrode unit 2 provided in the static eliminator 1.

Figure 17:
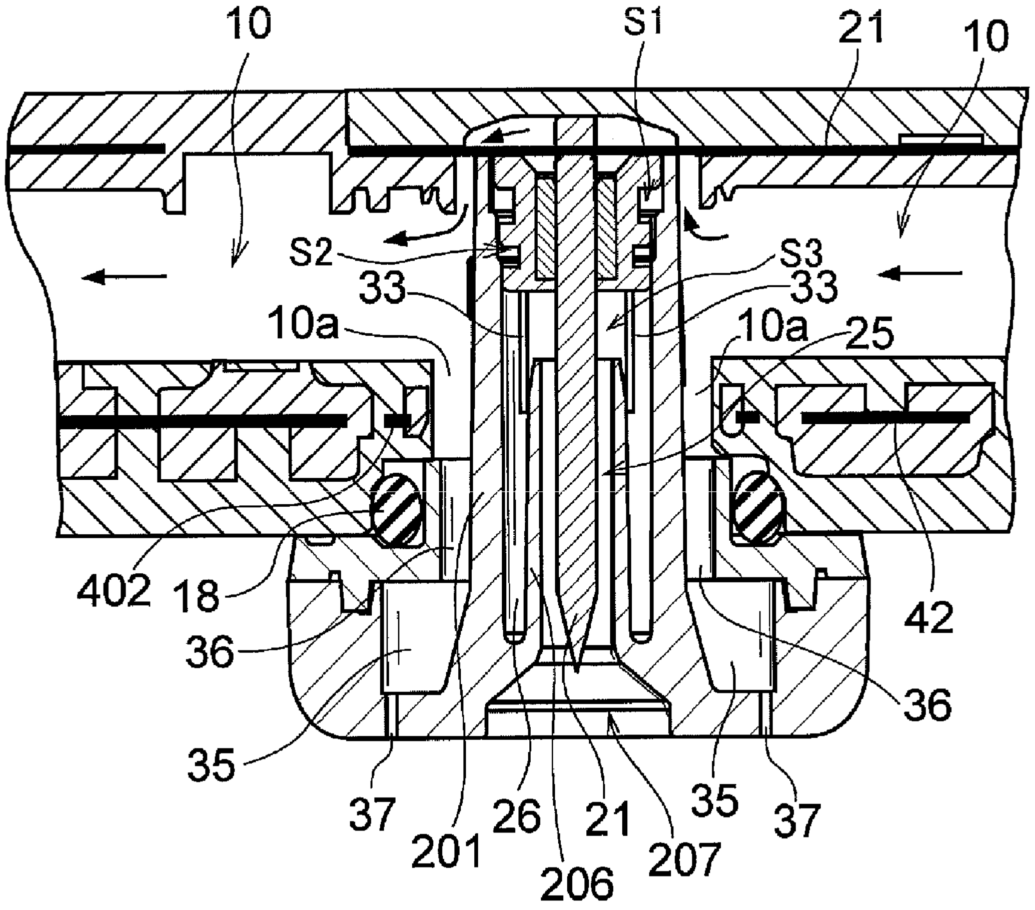
FIG. 17 is an expanded sectional view in which a region X17 portion of the half base has been extracted.
Figure 18:
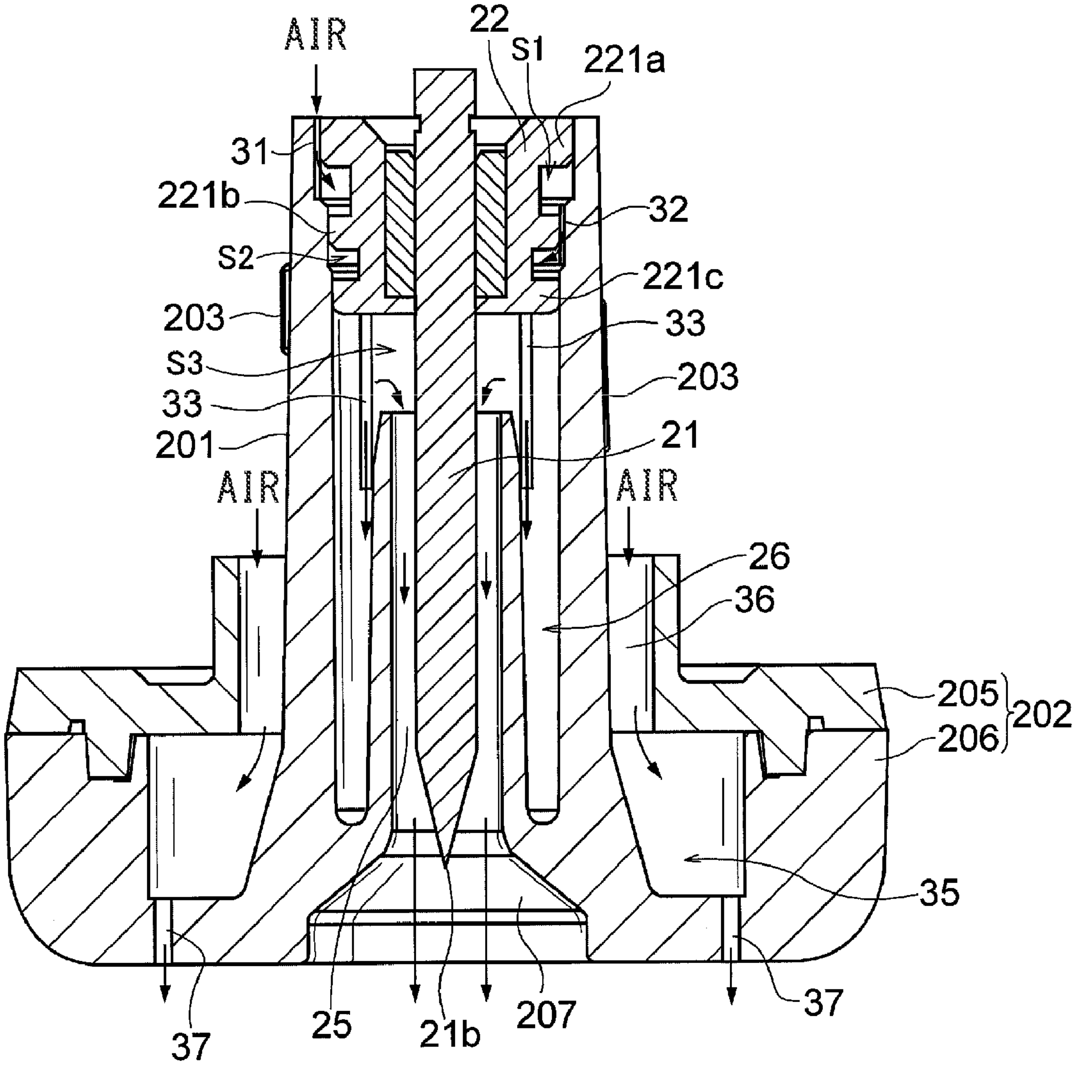
FIG. 18 is a sectional view corresponding to FIG. 10, for explaining the flow of a clean gas inside the discharge electrode unit.

The main discharge electrode unit 2 and the additional discharge electrode unit 3 are detachably mounted in the respective ports 16, 17 through sealing ring 18 (FIG. 17) by a later-described method. It should be noted that in the case of omitting mounting of the additional discharge electrode unit 3, a sealing member (not shown) for sealing the additional unit accepting port 17 is detachably mounted on the additional unit accepting port 17.

Figure 8:
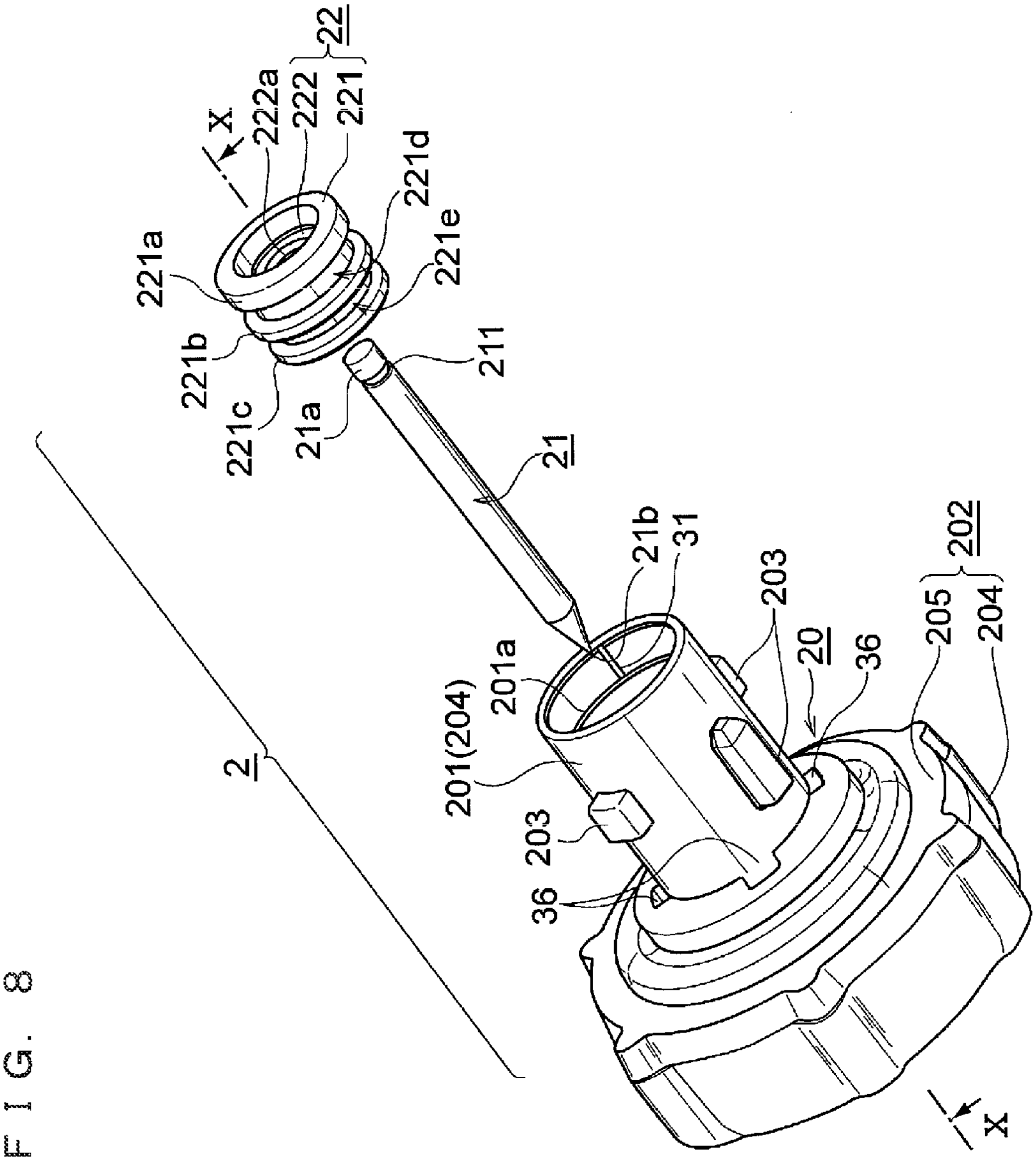
FIG. 8 is an exploded perspective view of a discharge electrode unit.

FIG. 8 is an exploded perspective view of the main discharge electrode unit 2. The main discharge electrode unit 2 is made up of a unit body 20 made of an insulating synthetic resin, the discharge electrode 21, and a discharge electrode holding member 22. The discharge electrode 21 includes a base end 21*a* provided with a circumferential groove 211 and a pointed leading end 21*b*, but the shape of the leading end 2*b* is arbitrarily formed.

Figure 9:
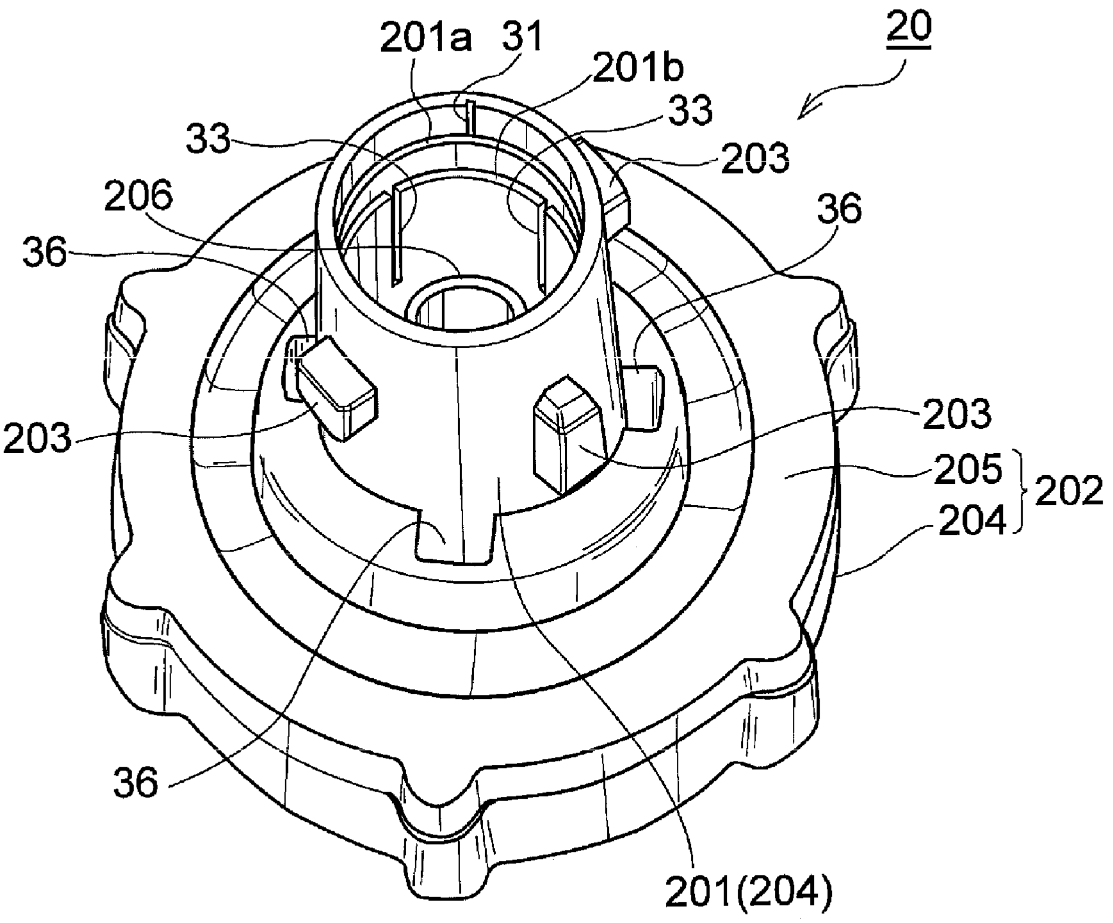
FIG. 9 is a perspective view of a unit body of the discharge electrode unit seen from the diagonally upper side thereof.

FIG. 9 is a perspective view of the unit body 20 seen from the diagonally upper side thereof. With reference to FIGS. 8 and 9, the unit body 20 has an outside cylindrical wall 201 and an expanded head section 202, and on the outer circumferential surface of the outside cylindrical wall 201, a plurality of projections 203 are formed in a mutually circumferentially spaced condition. With these projections 203, the main discharge electrode unit 2 can be engaged into the main unit accepting port 16 of the base 5, so as to be detachably mounted onto the base 5. Specifically, a projecting section into which the projection 203 is engaged is formed in the main unit accepting port 16, and the projection 203 is brought into the state of being engaged in the main unit accepting port 16 when the main discharge electrode unit 2 is inserted into the main unit accepting port 16 and circumferentially rotated by a prescribed angle, and the main discharge electrode unit 2 can be detached from the main unit accepting port 16 when rotated in the reversed direction. Since such a detachable mounting method is conventionally known, a detailed description thereof is not given.

Figure 10:
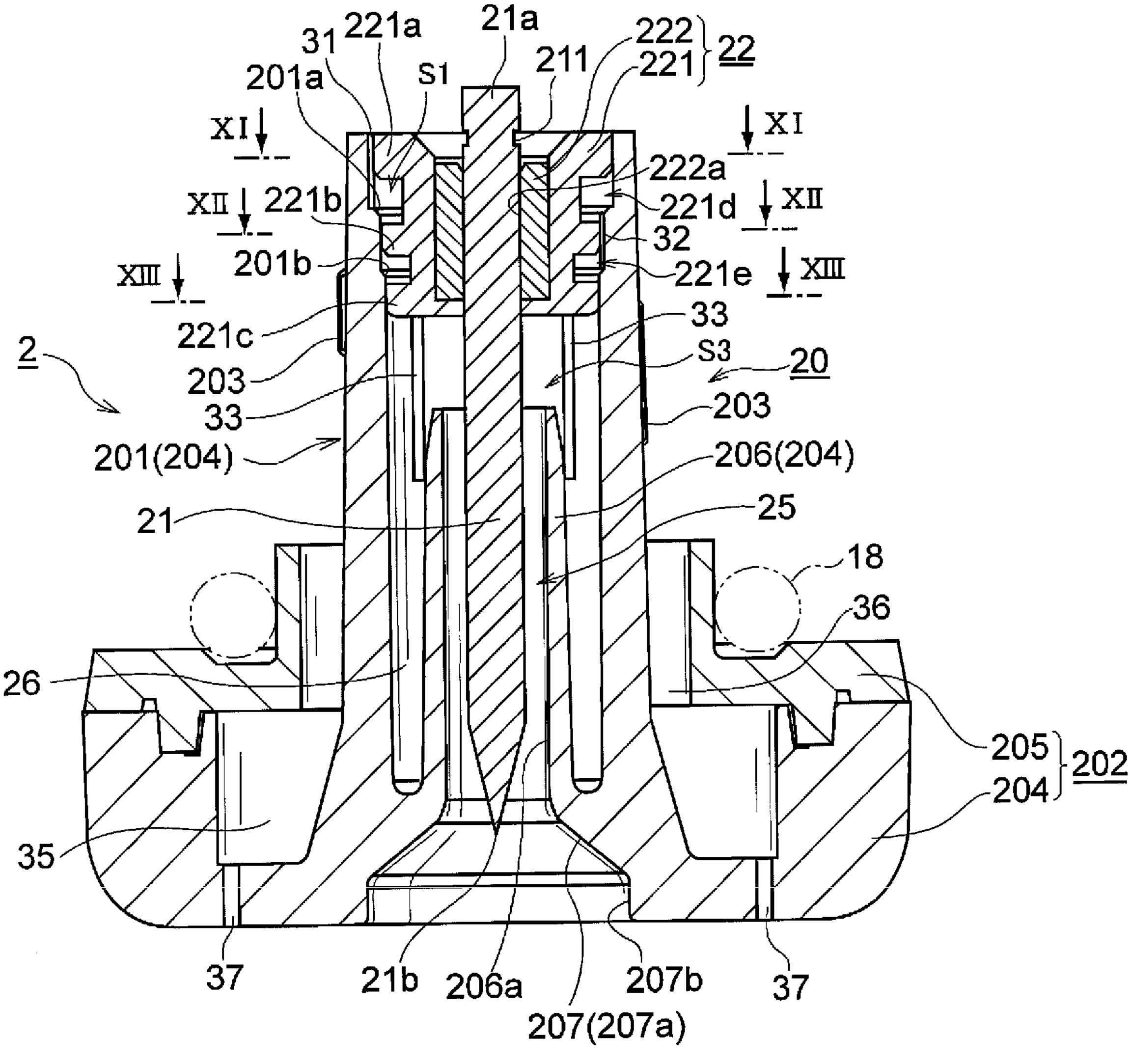
FIG. 10 is a sectional view of the discharge electrode unit along line X-X of FIG. 8.
Figure 11:
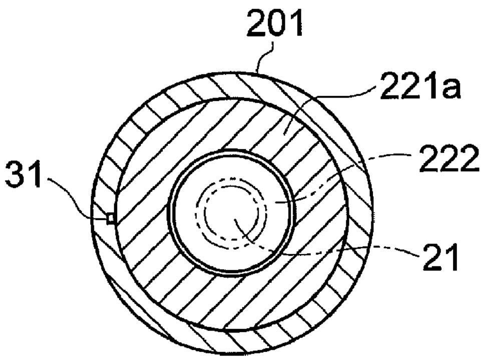
FIG. 11 is a sectional view along line XI-XI of FIG. 10.

FIG. 10 is a sectional view of the main discharge electrode unit 2 along line X-X of FIG. 8. As seen from FIG. 10, the unit body 20 is formed by attachment of a main member 204 and an auxiliary member 205 which were both made of an insulating resin material.

Continuously with reference to FIG. 10, the unit body 20 has an inside cylindrical wall 206 spaced inward in the diametrical direction of the outside cylindrical wall 201. The inside cylindrical wall 206 and the outside cylindrical wall 201 are concentrically disposed, and the shaft center is provided with the discharge electrode 21. The inside cylindrical wall 206 has a central long hole 206*a* having a cross-sectionally circular shape concentric with the inside cylindrical wall 206. In the inside cylindrical wall 206, the top of the central long hole 206*a* is opened and the bottom thereof is opened to the outside through the expanded head section 202. Numeral 207 denotes this opening section of the expanded head section 202. The central opening section 207 has a taper surface 207*a* with its diameter expanded downward, and this taper surface 207*a* is continued to a cylindrical surface 207*b* of the bottom (opening end) of the central opening section 207. Meanwhile, the top of the inside cylindrical wall 206 is opened so as to face a circumferential chamber S3 formed between the later-described discharge electrode holding member 22 and the inside cylindrical wall 206. In other words, the inside cylindrical wall 206 is positioned inside the main discharge electrode unit 2, and formed in the range surrounding part of the discharge electrode 21, except for a portion supported by the discharge electrode holding member 22, from the leading end 21*b* of the discharge electrode 21 toward the discharge electrode holding member 22.

The leading end 21*b* of the discharge electrode 21 is positioned so as to slightly project from the central long hole 206*a* to the taper surface 207*a*. As seen from FIG. 10, the discharge electrode 21 is mounted concentrically with the center line of the central long hole 206*a*, namely the shaft line of the inside cylindrical wall 206, and the outer circumferential surface of the discharge electrode 21 and the inner circumferential surface of the inside cylindrical wall 206 are in a mutually spaced state. Here, the inner diameter of the inside cylindrical wall 206 is uniform in the shaft line direction, and is larger than the outer diameter of the discharge electrode 21. It is to be noted that the discharge electrode 21 has the uniform outer dimensions over almost the full length thereof except for its leading end.

The top of the inside cylindrical wall 206 is located in the longitudinally intermediate portion of the discharge electrode 21. A cylindrical gas outflow channel 25 for shielding, which is circumferentially continued over the full length of the inside cylindrical wall 206, is formed between the inside cylindrical wall 206 and the discharge electrode 21. Further, the bottom of the inside cylindrical wall 206 is penetrated down to the expanded head section 202. More specifically, the bottom of the inside cylindrical wall 206 is located in the vicinity of a position as high as the bottom of the central long hole 206*a*.

A first gas pool 26 is formed between the inside cylindrical wall 206 and the outside cylindrical wall 201 concentric with the inside cylindrical wall 206. The bottom of this first gas pool 26 is penetrated down to the expanded head section 202. Specifically, the first gas pool 26 is mounted in a relation such that a section of the discharge electrode 21 from its longitudinally intermediate portion up to the vicinity of the leading end 21*b* diametrically overlaps the gas outflow channel 25 for shielding which extends along the circumferential surface of the discharge electrode 21. More specifically, the first gas pool 26 with the inside cylindrical wall 206 functioning as a partition wall is disposed around the gas outflow channel 25 for shielding which extends from the longitudinally central portion of the discharge electrode 21 to the leading end thereof along the circumferential surface of the discharge electrode 21, and this first gas pool 26 is circumferentially continued as well as longitudinally continued. Further, the one end of the first gas pool 26 faces the circumferential chamber S3, and is connected to the gas outflow channel 25 for shielding, which is formed inside the inside cylindrical wall 206, through the circumferential chamber S3. In other words, the one end of the first gas pool 26 made open to the circumferential chamber S3 and the top of the inside cylindrical wall 206 are formed at almost the same height.

The discharge electrode holding member 22 mounted on the base end 21*a* of the discharge electrode 21 is configured of the outer circumferential member 221 in ring shape and an inner circumferential member 222 intruded into the outer circumferential member 221 (FIGS. 8 and 10). The outer circumferential member 221 is made up of a metal-made processed component, and the inner circumferential member 222 is made up of a molded resin article. The inner circumferential member 222 has the central long hole 222*a*, and the base end 21*a* of the discharge electrode 21 is intruded into this central long hole 222*a*.

The outer circumferential surface of the outer circumferential member 221 has three circumferential flanges 221*a*, 221*b*, 221*c* which are located in a mutually vertically spaced condition, and between these flanges, circumferential grooves 221*d*, 221*e* located in a vertically spaced condition (FIGS. 8 and 10) are formed. The upper flange 221*a* located on the base end side of the discharge electrode 21 has the largest diameter, the lower flange 221*c* located on the top side of the discharge electrode 21 has the smallest diameter, and the intermediate flange 221*b* located in between the upper and lower flanges 221*a* and 221*c* has an intermediate diameter.

In correspondence with the outer circumferential member 221, two stages 201*a*, 201*b* are formed at the top of the inner surface of the outside cylindrical wall 201 of the unit body 20 (FIGS. 9 and 10). Specifically, a portion adjacent to the top of the inner surface of the outside cylindrical wall 201 has a relatively large diameter, a portion beyond the first stage 201*a* under the stage 201*a* has an intermediate diameter, and a portion beyond the second stage 201*b* under the stage 201*a* has a relatively small diameter. In the above outer circumferential member 221, the upper flange 221*a* is placed in the top section of the outer circumferential member 221, the intermediate flange 221*b* is placed in the vicinity of the first stage 201*a*, and the lower flange 221*c* is placed in the vicinity of the second stage 201*b*. Thereby, the circumferential chamber S1, which is continued in the circumferential direction of the first stage, is defined in an airtight state by the first circumferential groove 221*d* between the upper flange 221*a* and the intermediate flange 221*b*, and the second-stage circumferential chamber S2 is defined in an airtight state by the second circumferential groove 221*e* which is continued in the circumferential direction between the intermediate flange 221*b* and the lower flange 221*c*. The lower-stage flange 221*c* is located upward while spaced over the top of the inside cylindrical wall 206, whereby the circumferential chamber S3, which is expanded and circumferentially continued while continued to the foregoing first gas pool 26 and gas outflow channel 25 for shielding, is formed under the lower-stage flange 221*c* (FIG. 10).

Figure 12:
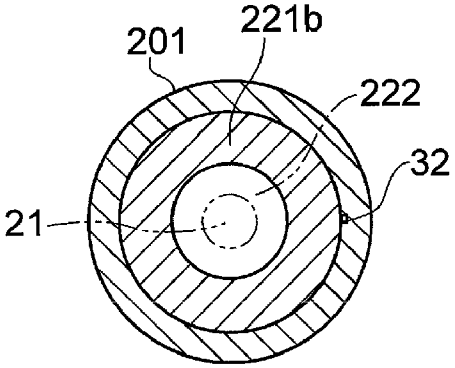
FIG. 12 is a sectional view along line XII-XII of FIG. 10.
Figure 13:
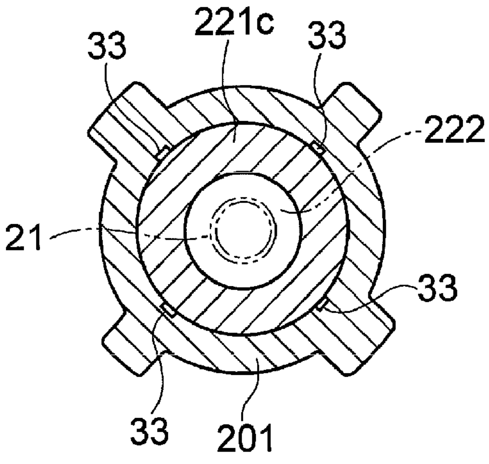
FIG. 13 is a sectional view along line XIII-XIII of FIG. 10.

On the inner wall of the outside cylindrical wall 201 of the unit body 20, in the portion having relatively the largest diameter in the top section, one first chase 31 is formed (FIGS. 8 to 11). Further, one second chase 32 is formed between the first stage 201*a* and the second stage 201*b* (FIGS. 10 and 12), and four third chases 33 extending from the second stage 201*b* to the longitudinally central portion of the outside cylindrical wall 201 are formed (FIGS. 9, 10 and 13). The first to third chases 31 to 33 extend in parallel with the shaft line of the outside cylindrical wall 201. Further, the third chase 33 will be described in detail with reference to FIGS. 9 and 10. The deep section of the third chase 33 extends downward beyond the top of the inside cylindrical wall 206 and penetrates down to the inside of the first gas pool 26.

With reference to FIG. 10, in the expanded head section 202 of the unit body 20, a second gas pool 35 is formed around the bottom of the foregoing central long hole 206*a* and a taper surface 207*a* continued thereto by the main member 204 and the auxiliary member 205. The second gas pool 35 is circumferentially continued. To this second gas pool 35, a clean gas is supplied from the foregoing internal gas channel 10 through an assist gas inflow channel 36 formed between the inner circumferential surface of the auxiliary member 205 and the bottom of the outside cylindrical wall 201 (FIG. 3). A total of four assist gas inflow channels 36 are provided with circumferential spacing of 90 degrees (see FIGS. 8 and 9). In the expanded head section 202, the assist gas inflow hole 37 configured of a thorough hole with a small diameter is formed on the bottom surface of the main member 204, and through this assist gas inflow hole 37, the clean gas inside the second gas pool 35 is allowed to flow to the outside. As is the most apparent from FIG. 4, the total of four assist gas inflow holes 37 are formed with spacing of 90 degrees on a circumference concentric with the central opening section 207 around the central opening section 207 of the expanded head section 202. A flow rate of the clean gas inside each of the assist gas inflow holes 37 is previously set to about 200 m/sec. Since the clean gas discharged from the assist gas inflow hole 37 under such control is released from the restraint of the diameter of the assist gas inflow hole 37, though it flows at a far low flow rate than about 200 m/sec, it outflows downward in a conical shape at a far higher flow rate than the flow rate of a later-described ionized clean gas discharged from the gas outflow channel 25 for shielding.

The foregoing first chase 31 and second chase 32 on the inner wall of the outside cylindrical wall 201 are in the positional relation of being circumferentially offset by 180 degrees. That is, the first chase 31 and the second chase 32 are set so as to be in the relation of being disposed while diametrically opposed to each other. Further, the four three chases 33 are mounted with circumferential spacing of 90 degrees, and each third chase 33 is formed in the relation of being circumferentially offset by 45 degrees from the second chase 32.

It is to be noted that, although the additional discharge electrode unit 3 and the main discharge electrode unit 2 substantially have the same configuration as described above, the additional discharge electrode unit 3 is different from the main discharge electrode unit 2 in not having the assist gas function. Therefore, in the additional discharge electrode unit 3, the second gas pool 35 provided in the main discharge electrode unit 2, and the assist gas inflow channel 36 and the assist gas inflow hole 37, which are relevant to the second gas pool 35, are not present.

Figure 14:
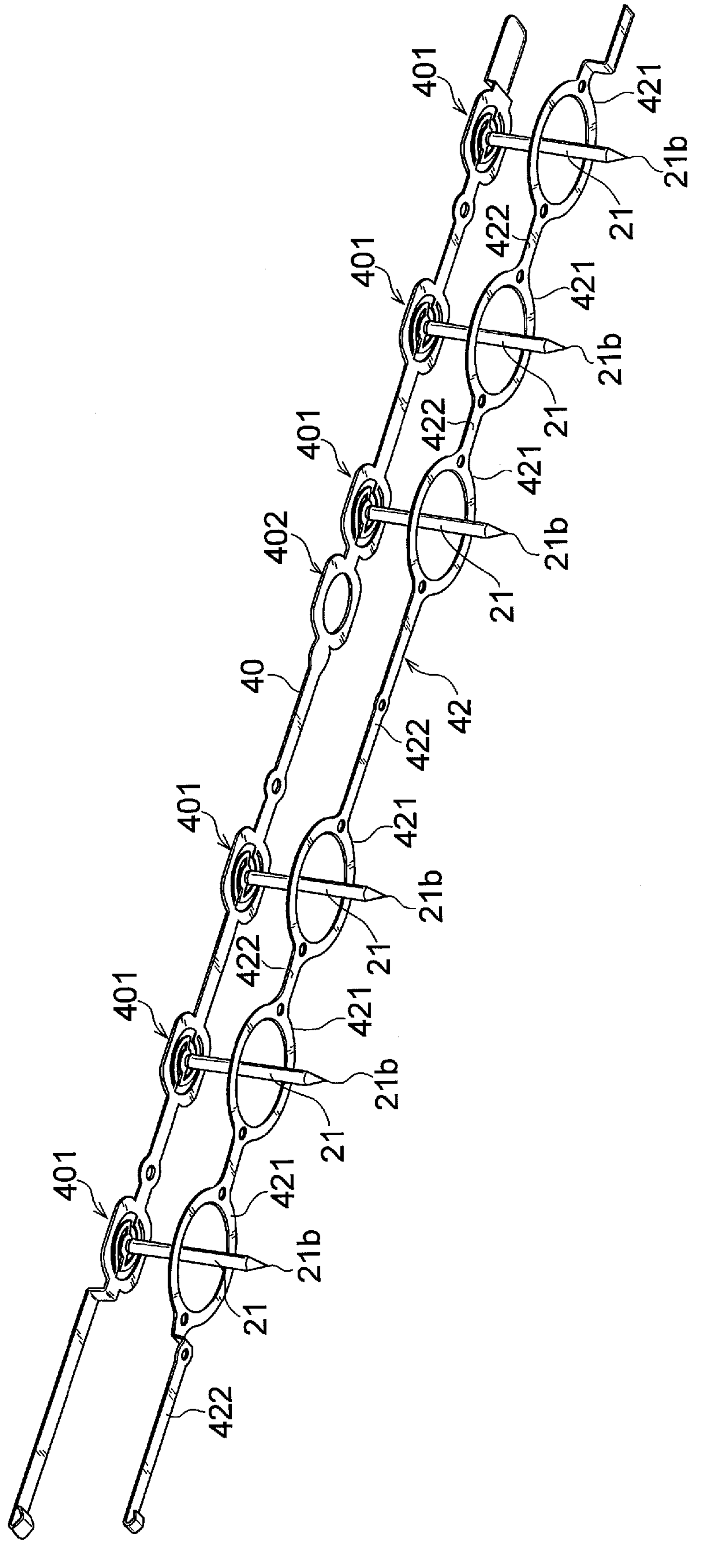
FIG. 14 is a perspective view for explaining, by extracting, a distribution plate to supply a high voltage to a discharge electrode and a ground electrode plate around each discharge electrode.

FIG. 14 is a view for explaining application of a high voltage to each discharge electrode 21 of the main discharge electrode unit 2 and the additional discharge electrode unit 3 and a configuration concerning a ground electrode mounted around each discharge electrode 21. With reference to FIG. 14, a high voltage is supplied to each discharge electrode 21 by the distribution plate 40. The distribution plate 40 has a web shape continuously extending over the full length of the half base 5A, and a portion 401 engaged with the base end 21*a* of each discharge electrode 21 has been press-molded in S-shape for providing spring properties to the central portion of this engagement portion 401. The circumferential groove 211 of each discharge electrode 21 is engaged with the circular hole in the central portion of this S shape (FIG. 3). A circular hole 402 is formed in the longitudinal central portion of the distribution plate 40.

In a case where the total length of one half base 5A is 23 cm and a large number of this type of half bases 5A are connected to make the length of the static eliminator larger than, for example, 2.3 m, an amount of a gas supplied to the longitudinal central portion of the static eliminator 1 might become smaller than other portions, with only the foregoing clean gas supplied from both ends of the longitudinal direction of the static eliminator 1. Therefore, in the static eliminator 1 having such a length, in addition to the supply of the clean gas from both ends thereof, the clean gas may be supplied from one end of the longitudinal direction to the outer case 4 through a pipe, through the circular hole 402 provided in the half base 5A disposed in the approximately central portion of the foregoing static eliminator and an opening formed in part of the top surface of the half base provided in the above-mentioned position, one end of the pipe for supply of the clean gas may be faced to internal gas channel 10.

Needless to say, as for the static eliminator 1 long enough to ensure a required gas amount by the supply of the clean gas from both ends thereof, it is not necessary to form an opening on the top surface of the half base 5A corresponding to the circular hole 402 and the position thereof. Further, although not shown, as for the static eliminator 1 in which the clean gas is supplied to the internal gas channel 10 by use of the circular hole 402, the high voltage unit 6 and the control substrate 7 are disposed in a space inside the outer case from the end of the longitudinal direction of the static eliminator 1, opposite to the one end provided with the pipe for supplying the clean gas is provided, to the circular hole 402 faced by the pipe, so as to avoid interference with the pipe.

Figure 15:
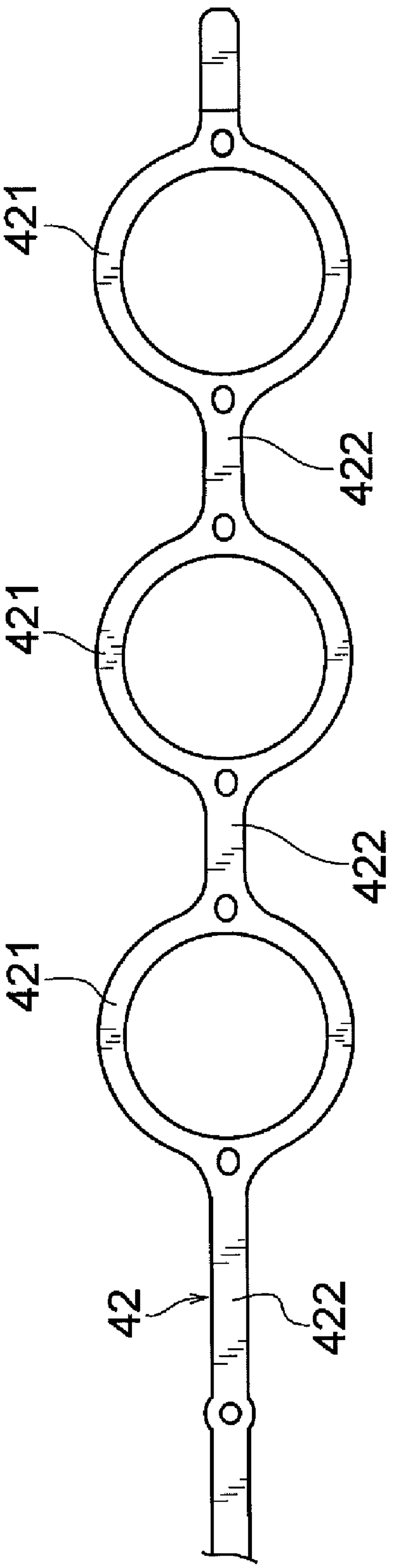
FIG. 15 is a partial plan view of the ground electrode plate.

Continuously with reference to FIG. 14, an opposing electrode, namely a ground electrode plate member 42, is mounted around each discharge electrode 21 (FIG. 3). In this embodiment, the ground electrode plate member 42 is configured of a plate member, and includes a circular ring section 421 concentric with each discharge electrode 21, and a linear connecting section 422 that connects each circular ring section 421 (FIGS. 3 and 15). This ground electrode plate member 42 is buried inside the bottom side of the half base 5A shown in FIG. 6. This circular ring section 421 is mounted in a position as high as where the foregoing gas outflow channel 25 for shielding and the first gas pool 26 located on the outer circumferential side of the gas outflow channel 25 for shielding are present. More specifically, each circular ring section 421 of the ground electrode plate member 42 is configured so as to surround the discharge electrode on the base 5 constituting the lower portion of the static eliminator 1, and in the inside of the circular ring section 421, the main discharge electrode unit 2 or the additional discharge electrode unit 3 is disposed. In the present embodiment, the circular ring section 421 is disposed in the state of being buried inside the base 5 on the base 5 side through the internal gas channel 10 formed inside the base 5 from the outside cylindrical wall 201 of the main discharge electrode unit 2.

The distribution plate 40 is fixedly mounted on a ceiling wall 501 of the half base 5A, and each circular ring section 421 of the ground electrode plate member 42 is buried on the bottom surface side of the half base 5A where the discharge electrode units 2, 3 are held and in the vicinity of a side-surface-side side wall 502 (FIG. 3). At least, a portion 502*a* in which the ground electrode plate member 42 is buried is made of an insulating material, e.g. a synthetic resin material excellent in insulating properties. As thus described, since the circular ring section 421 of the ground electrode plate member 42 is mounted around the discharge electrode 21 with the ground electrode plate member 42 in the buried state, an electric field formed between the discharge electrode 21 and the ground electrode (ground electrode plate member 42) can be relatively weakened without generating surface discharge from the discharge electrode 21 to the ground electrode plate member 42, namely between the circular ring section 421 and the discharge electrode 21. It is thereby possible to relatively strengthen the electric field between the discharge electrode 21 and a workpiece (not shown).

More specifically, the smaller the diameter of the circular ring 421, the more possible it is to weaken the electric field formed between the discharge electrode 21 and the ground electrode plate member 42 to the utmost, whereas a withstand voltage between the circular ring 421 and the discharge electrode 21 might not be maintained when the diameter of the circular ring 421 is made excessively small. For this reason, it is preferable that the diameter of the circular ring 421 be large enough to maintain the withstand voltage between the circular ring 421 and the discharge electrode 21, while being small enough to weaken the electric field formed between the discharge electrode 21 and the ground electrode plate member 42 to the utmost. The diameter of the circular ring 421 in the present embodiment, in the case of the discharge electrode 21 being set as its diametrical center, is larger than the first gas pool 26 and smaller than the outside cylindrical wall 201.

Further, each circular ring 421 formed around each discharge electrode 21 is connected with each other by the connecting section 422 which has a smaller width than the diameter of the circular ring 421 and extends linearly. The connecting section 422 is disposed on almost a straight line connecting the discharge electrodes 21, 21, while in the state of being incorporated in the static eliminator 1. Further, this straight-line section 422 preferably has a small width in order to weaken the electric field formed between the discharge electrode 21 and the ground electrode plate member 42 to the utmost, so long as satisfying feeding performance, rigidity in assembly, and the like. That is, the connecting section 422 of the ground electrode plate member 42 is buried on almost a straight line connecting the discharge electrodes 21, 21 and in a portion between the adjacent discharge electrodes 21, 21 on the bottom surface side of the half base 5A where the discharge electrode units 2, 3 are held.

It is to be noted that, although the ground electrode plate member 42 is configured of a plate made of a metal press molded article in the embodiment, it is not necessarily a plate, and it goes without saying that a similar configuration may be formed using, for example, a wire-like linear member.

Figure 19:
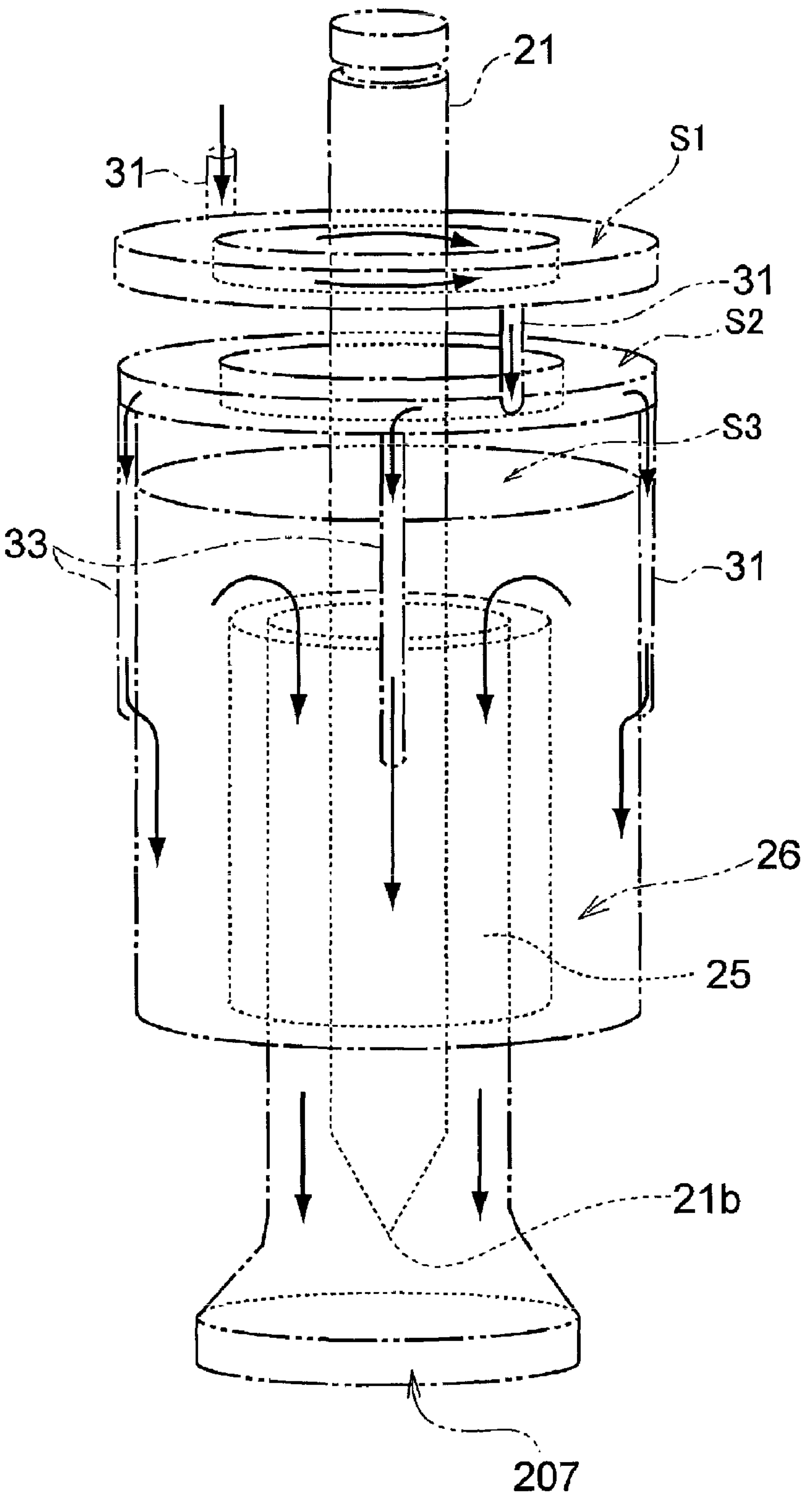
FIG. 19 is a view for explaining the relation of chambers, orifices, gas pools and a gas channel for shielding, relevant to the flow of the clean gas inside the discharge electrode unit.

With reference to FIGS. 16 to 19, description will be given of the flow of a gas for shielding, which surrounds the leading end 21*b* of the discharge electrode 21 to suppress contamination of the discharge electrode 21. Here, FIG. 19 is a conceptual view of a configuration relevant to the gas flow.

An air purified by a filter or the like, or a clean gas such as an inert gas like a nitrogen gas, is supplied to the internal gas channel 10, and the clean gas flowing through this internal gas channel 10 flows into the first-stage circumferential chamber S1 through a first orifice that is defined by the foregoing one first chase 31, with the influence of pulsation of the internal gas channel 10 being in a suppressed state. The clean gas inside the first-stage circumferential chamber S1 flows into the second-stage circumferential chamber S2 through a second orifice that is defined by one second chase 32 provided in a position diametrically opposed to the first chase 31. The clean gas inside the second-stage circumferential chamber S2 then passes through a third orifice that is defined by four third chases 33 circumferentially offset from the second chase 32 by 45 degrees, and flows downward.

The clean gas flowing through the internal gas channel 10 of the half base 5A flows into the first-stage and second-stage circumferential chambers S1, S2 through the first and second orifices made up of the first and second chases 31, 32, and the clean gas inside the second-stage chamber S2 then flows into the first gas pool through the four third chases 33. That is, the clean gas inside the second-stage circumferential chamber S2 is guided by the four third chases 33 to flow into the first gas pool 26, and since the deep portion of this first gas pool 26 extends down to the expanded head section 202, it is possible to convert the clean gas flown into the first gas pool 26 into static pressure.

In particular, since the clean gas is supplied to the first gas pool 26 through the circumferentially spaced multi-stage orifices, which are the foregoing first and second chases 31, 32 one each, it is possible to improve the static pressure of the clean gas inside the first gas pool 26 to a high level while shutting off the influence of pulsation of the internal gas channel 10. The clean gas inside the first gas pool 26 then passes over the top of the inside cylindrical wall 206 through the circumferential chamber S3 circumferentially expanded from this first gas pool 26, and flows into the gas outflow channel 25 for shielding inside the inside cylindrical wall 206.

Since, as described above, the gas outflow channel 25 for shielding extends in a thin long cylindrical shape along the outer circumference of the discharge electrode 21 from the longitudinal central portion to the top 21*b* of the discharge electrode 21, the clean gas that passes inside this gas outflow channel 25 for shielding becomes a laminar flow and outflows downward through the central opening section 207. Therefore, the clean gas flowing along the longitudinal direction of the discharge electrode 21 inside the gas outflow channel 25 for shielding located in contact with the outer circumferential surface of the discharge electrode 21 becomes a laminar flow in the process of passing through the gas outflow channel 25 for shielding and outflows toward the workpiece while in the state of surrounding the leading end 21*b* of the discharge electrode 21, whereby it is possible to improve a sheath effect of the discharge electrode 21 with respect to the leading end 21*b*, so as to improve the effect of preventing contamination of the discharge electrode 21.

In the present embodiment, the flow rate of the clean gas inside the gas outflow channel 25 for shielding in contact with the outer circumferential surface of the discharge electrode 21 is set to about 1 m/sec. Since the ionized clean gas controlled in this manner and discharged from the central opening section 207 is released from the restraint of the diameter of the gas outflow channel 25 for shielding, it outflows downward at a far lower flow rate than about 1 m/sec in the shape of a cylinder having a diameter almost as large as a final open end of the central opening section 207.

Further, since the inner or outer double walls in the outward diametrical direction of the discharge electrode 21, namely the inside cylindrical wall 206 and the outside cylindrical wall 201, form the first gas pool 26 extending to the leading end of the discharge electrode 21, it is possible to set the diameter of the outside cylindrical wall 201 of the main discharge electrode unit 2 to be small, while maintaining the static pressure effect of the first gas pool 26.

As the most well understood from FIG. 19, the following configuration has been adopted to the static eliminator 1 of the embodiment; the first-stage circumferential chamber S1, the second-stage circumferential chamber S2 and the first gas pool 26 are arrayed in series along the longitudinal direction of the discharge electrode 21, and the first gas pool 26 and the gas outflow channel 25 for shielding which is located on the inner circumferential side of this first gas pool 26 are disposed in a diametrically overlapping mode; and the clean gas is supplied to the first gas pool 26 through the spaces S1, S2 disposed at multi-stages by means of the circumferentially spaced multi-stage orifices (the first and second chases 31, 32). Accordingly, it is naturally possible not only to shut off the first gas pool 26 from the pulsation of the internal gas channel 10, but also to improve the static pressure of the first gas pool 26 as thus described, and since the multi-stage orifices (first and second chases 31, 32) are formed in the inner surface of the outside cylindrical wall 201 and the vertically multi-stage flanges 221*a* to 221*c* are also formed on the outer circumferential surface of the discharge electrode holding member 22 cantilevering the discharge electrode 21 so that the first and second circumferential grooves 221*d*, 221*e* between these flanges form the multi-stage spaces S1, S2, it is possible to form the state where the multi-stage spaces S1, S2 and the first gas pool 26 are arrayed in the longitudinal direction of the discharge electrode 21, so as to shut off the pulsation of the foregoing gas for shielding and ensure high-level static pressure, and simultaneously set the diameter of the outside cylindrical wall 201 to be small.

In the foregoing embodiment, the flow rate of the clean gas inside the gas outflow channel 25 for shielding in contact with the outer circumferential surface of the discharge electrode 21 is set to about 1 m/sec and the flow rate of the clean gas inside each assist gas inflow hole 37 is set to about 200 m/sec. However, these specific numeric values of the flow rates inside the gas outflow channel 25 for shielding and the assist gas inflow hole 37 are mere examples. Naturally, for example, the flow rate of the clean gas inside the gas outflow channel 25 for shielding can be set to be higher than 1 m/sec for the purpose of increasing the speed of static elimination of the workpiece (purpose of increasing the speed of arrival of ions at the workpiece), and for example, a flow rate value of the clean gas inside the gas outflow channel 25 for shielding may be approximately the same as a flow rate value of the clean gas inside the assist gas inflow hole 37.

What is claimed is:

1. A static eliminator, comprising:
- discharge electrodes, disposed while mutually longitudinally spaced in a long case;
- an internal gas channel, provided inside the case and which extends from one end of the case through the other end thereof;
- a gas outflow channel for shielding which extends concentrically with the discharge electrode while in contact with the outer circumferential surface of the discharge electrode;
- a gas pool, provided on the outer circumference of the gas outflow channel for shielding;
- a chamber which extends circumferentially and concentrically along the discharge electrode and is disposed between the internal gas channel and the gas pool along the longitudinal direction of the discharge electrode;
- a first orifice disposed between the internal gas channel and the chamber; and
- a second orifice disposed between the chamber and the gas pool.

2. The static eliminator according to claim 1, wherein the gas pool diametrically overlaps part of the gas outflow channel for shielding.

3. The static eliminator according to claim 1, wherein the gas pool has a gas pool portion extending along the longitudinal direction of the discharge electrode for pooling the gas provided from the chamber and a connecting portion for connecting with the gas outflow channel and the connecting portion is disposed adjacent to the chamber in the longitudinal direction of the discharge electrode.

4. The static eliminator according to claim 3, wherein the connection portion provides the gas at static pressure from the gas pool to the gas outflow channel.

5. The static eliminator according to claim 1, wherein
- the chamber is provided at a plurality of stages in the shaft-line direction of the discharge electrode,
- adjacent chambers are communicated through an inter-chamber orifice, and
- each of the first, second and inter-chamber orifices is circumferentially offset from each other.

6. The static eliminator according to claim 1, wherein
- the chamber, the gas pool, the gas outflow channel for shielding, the first orifice and the second orifice are formed into one unit, and
- the unit is detachable from a body of the static eliminator.

7. A static eliminator, comprising:
- discharge electrodes, disposed while mutually longitudinally spaced in a long case;
- an internal gas channel, provided inside the case and extends from one end of the case through the other end thereof;
- a gas outflow channel for shielding which extends concentrically with the discharge electrode while in contact with the outer circumferential surface of the discharge electrode;
- a gas pool, provided on the outer circumference of the gas outflow channel for shielding and is mounted concentrically with the gas outflow channel for shielding;
- an orifice, mounted between the gas pool and the internal gas channel; and
- a chamber which extends circumferentially and concentrically with the discharge electrode between the internal gas channel and the gas pool, wherein
- the chamber and the internal gas channel are communicated through a first orifice,
- the chamber and the gas pool are communicated through a second orifice, and
- the first orifice and the second orifice are circumferentially offset.

8. The static eliminator according to claim 7, wherein
- the chamber is provided at a plurality of stages in the shaft-line direction of the discharge electrode,
- adjacent chambers are communicated through an inter-chamber orifice, and
- each of the first, second and inter-chamber orifices is circumferentially offset.

9. The static eliminator according to claim 7, wherein
- the chamber, the gas pool, the gas outflow channel for shielding, the first orifice and the second orifice are formed into one unit, and
- the unit is detachable from a body of the static eliminator.

10. The static eliminator according to claim 7, wherein the gas pool has a gas pool portion extending along the longitudinal direction of the discharge electrode for pooling the gas provided from the chamber and a connecting portion for connecting with the gas outflow channel and the connecting portion is disposed adjacent to the chamber in the longitudinal direction of the discharge electrode.

11. The static eliminator according to claim 10, wherein the connection portion provides the gas at static pressure from the gas pool to the gas outflow channel.

12. A discharge electrode unit detachably built in a static eliminator, which supplies a clean gas from an internal gas channel to the periphery of a discharge electrode, and applies a high voltage to the discharge electrode to generate ions and also shield the leading end of the discharge electrode with the gas, the discharge electrode unit comprising:

inside and outside cylindrical walls which are concentric with the discharge electrode;

a discharge electrode holding member for detachably fixing a basic end section of the discharge electrode to the outside cylindrical wall;

a gas outflow channel for shielding which is mounted in a open-top/end central long hole of the inside cylindrical wall and extends along the discharge electrode while in contact with the circumferential surface of the discharge electrode;

a gas pool, formed between the inner cylindrical wall and the outside cylindrical wall;

a chamber, formed between a circumferential groove formed on the outer circumferential surface of the discharge electrode holding member and the inner circumferential surface of the outside cylindrical wall;

a first orifice which communicates the chamber with the internal gas channel; and a second orifice, which communicates the chamber with the gas pool, and is disposed while circumferentially offset from the first orifice.

13. The discharge electrode unit according to claim 12, wherein a plurality of circumferential grooves are provided on the outer circumferential surface of the discharge electrode holding member, multi-stage chambers are formed in the longitudinal direction of the discharge electrode between the plurality of circumferential grooves and the inner circumferential surface of the outside cylindrical wall, and the adjacent chambers are communicated through an inter-chamber orifice, and the inter-chamber orifice, the first orifice and the second orifice are circumferentially offset.

* * * * *